Patented Sept. 3, 1940

2,213,740

UNITED STATES PATENT OFFICE 2,213,740

AZO COMPOUNDS AND MATERIAL COLORED THEREWITH

James G. McNally and Joseph B. Dickey, Rochester, N. Y., assignors to Eastman Kodak Company, Rochester, N. Y., a corporation of New Jersey No Drawing. Application July 18, 1939,
Serial No. 285,209

8 Claims. (Cl. 260—205)

This invention relates to the art of dyeing or coloring. More particularly, it relates to new arylazo dye compounds and the application of the nuclear non-sulfonated dye compounds for the coloration of organic derivatives of cellulose, particularly textile materials made of or containing an organic derivative of cellulose by dyeing, printing, stenciling or like methods.

Organic derivatives of cellulose are characterized by an indifferent affinity for the usual cotton and wool dyes especially the ordinary water soluble dyes. Because of this, it has been necessary to develop new dye compounds suitable for the dyeing or coloration of materials, such as textile materials, made of or containing an organic derivative of cellulose. It is, accordingly, an object of our invention to provide a new class of aromatic azo dyes suitable for the dyeing or coloration of organic derivatives of cellulose. Another object is to provide a process for the coloration of organic derivatives of cellulose in which the dye or dyes are applied directly from an aqueous suspension to the material undergoing coloration. A further object is to produce dyeings on organic derivatives of cellulose which are of good fastness to light and washing. Other objects will hereinafter appear.

Typical organic derivatives of cellulose include the hydrolyzed as well as the unhydrolyzed cellulose organic acid esters such as cellulose acetate, cellulose formate, cellulose propionate, or cellulose butyrate and the hydrolyzed as well as the unhydrolyzed mixed organic acid esters of cellulose, such as cellulose acetate-propionate, cellulose acetate-butyrate, and the cellulose ethers such as methyl cellulose, ethyl cellulose, or benzyl cellulose. While our invention will be illustrated more particularly in connection with the coloration of cellulose acetate, a material to which the invention is especially adapted, it will be understood that it applies to the coloration of other organic derivatives of cellulose such as those just mentioned.

The azo dye compounds of our invention have the probable general formula:

$$R-N=N-R_1$$

wherein R and $R_1$ each represents the residue of an aryl nucleus of the benzene series and wherein the nucleus $R_1$ contains in para position to the azo bond an amino group substituted with a

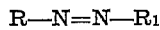

group wherein X represents a saturated short chain hydrocarbon linkage and Y represents a low membered alkyl group. As more clearly shown in the examples which follow hereinafter, it will be understood that the benzene nuclei represented by R and $R_1$ may be substituted.

X may be a saturated short chain hydrocarbon linkage such as —CH₂, —CH₂CH₂,

and —CH₂CH₂CH₂, for example. Illustrative of Y may be mentioned, for example, methyl, ethyl and a propyl group. Illustrative

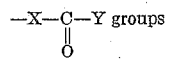

—X—C—Y groups include the β-ketopropyl group,

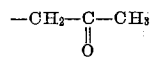

—CH₂—C—CH₃ the β-ketobutyl group,

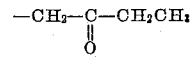

—CH₂—C—CH₂CH₃ the γ-ketobutyl group,

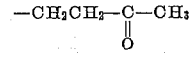

—CH₂CH₂—C—CH₃ the γ-ketoamyl group,

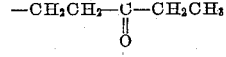

—CH₂CH₂—C—CH₂CH₃ and the α-methyl-γ-ketobutyl group,

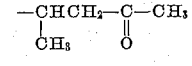

for example.

The azo dye compounds of our invention can be prepared by diazotizing a diazotizable arylamine of the benzene series and coupling the diazonium compound obtained with an aryl coupling component of the benzene series containing an amino group substituted with a

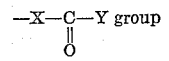

—X—C—Y group wherein X represents a saturated short chain hydrocarbon linkage and Y represents a low membered alkyl group, and wherein said coupling component is adapted to couple in para position to said amino group.

As previously indicated, the nuclear non-sulfonated azo dye compounds of our invention constitute valuable dyes for the coloration of organic derivatives of cellulose such as those hereinbefore mentioned yielding various shades thereon of good fastness to light and washing. Compounds containing a nuclear sulfonic acid grouping in either of the nuclei R and R₁ possess little or no utility for the coloration of organic derivatives of cellulose but can be employed to color textile materials such as wool and silk yielding generally similar shades as the corresponding non-sulfonated compounds yield on cellulose acetate silk, for example. These compounds can be prepared by sulfonation of the non-sulfonated compounds in accordance with known methods or by the use of previously sulfonated components. When the azo dye compounds of our invention are employed for the dyeing of organic derivatives of cellulose, it is also generally advantageous that the benzene nuclei R and R₁ contain no free carboxylic acid group. Similarly, the nuclear non-sulfonated compounds of our invention containing a γ-keto group appear to be advantageous for the dyeing of organic derivatives of cellulose, yielding dyeings of greater light fastness thereon.

The following examples illustrate the preparation of the azo dye compounds of our invention.

*Example 1*

0.1 gram mole of p-nitroaniline are dissolved in 150 cc. of water to which has been added 25 cc. of 36% hydrochloric acid. The solution resulting is cooled to a temperature approximating 0–5° C. and the p-nitroaniline is diazotized while maintaining this temperature by the addition, with stirring, of a water solution of 6.9 grams of sodium nitrite.

0.1 gram mole of 1-(methyl-β-ketopropyl) aminobenzene is dissolved in cold dilute hydrochloric acid and the diazonium solution prepared as described above is added with stirring. Following the addition of the diazo solution, the mixture resulting is permitted to stand for 30 minutes after which it is slowly made neutral to Congo red paper by the addition of sodium acetate. Upon completion of the coupling reaction which takes place, the dye compound formed is recovered by filtration, washed with water and dried. The dye compound obtained colors cellulose acetate silk an orange shade.

Equivalent gram molecular weights of 1-amino-2-chloro-4-nitrobenzene, 1-amino-2,4-dinitrobenzene and 1-amino-2-methoxy-4-nitrobenzene, for example, can be substituted for the p-nitroaniline of the example to obtain dye compounds of our invention.

*Example 2*

0.1 gram mole of p-aminoazobenzene is diazotized in known fashion and the diazonium compound obtained is coupled with 0.1 gram mole of 1-(ethyl-β-ketopropyl) amino - 3 - methylbenzene. Coupling and recovery of the dye compound formed may be carried out as described in Example 1. The dye compound obtained colors cellulose acetate silk a red shade.

*Example 3*

0.1 gram mole of 1-amino-2,4-dinitro-6-bromobenzene are diazotized in known fashion and the diazonium compound obtained is coupled with 0.1 gram mole of 1-(β-hydroxyethyl-β-ketopropyl)-aminobenzene. Coupling and recovery of the dye compound may be carried out as described in Example 1. The dye compound obtained colors cellulose acetate silk a rubine shade.

Similarly, 0.1 gram mole of 1-amino-4-acetobenzene may be diazotized and the diazonium compound obtained coupled with 0.1 gram mole of 1-(ethyl-β-ketopropyl) aminobenzene to obtain a dye compound which colors cellulose acetate silk an orange shade.

*Example 4*

0.1 gram mole of 1-amino-2-methoxy-4-nitrobenzene is diazotized in known fashion and the diazonium compound obtained is coupled with 0.1 gram mole of 1-(glyceryl-γ-ketobutyl) aminobenzene. Coupling and recovery of the dye compound may be carried out as described in Example 1. The dye compound obtained colors cellulose acetate silk a red shade.

Similarly 0.1 gram mole of 1-amino-2,4-dinitrobenzene can be diazotized and the diazonium compound obtained coupled with 0.1 gram mole of 1-(β-hydroxyethyl-γ-ketobutyl) amino-3-methylbenzene to obtain a dye compound which colors cellulose acetate silk a reddish-violet shade. Likewise 0.1 gram mole of 1-amino-2,4-dinitro-6-chlorobenzene can be diazotized and the diazonium compound obtained coupled with equivalent gram molecular weights of 1-(glyceryl-γ-ketobutyl) amino-3-methyl-6-methoxybenzene and 1-di-(γ-ketobutylamino)-3-methyl-6-methoxybenzene to obtain dyes which color cellulose acetate silk a reddish-blue-violet shade.

*Example 5*

0.1 gram mole of 1-amino-2-chloro-4-nitrobenzene is diazotized and the diazonium compound obtained is coupled with 0.1 gram mole of 1-α-methyl-γ-ketobutylamino benzene. Coupling and recovery of the dye compound formed may be carried out as described in Example 1. The dye compound obtained colors cellulose acetate silk an orange shade.

The following tabulation further illustrates the compounds of our invention together with the color they produce on cellulose acetate silk. The compounds indicated below may be prepared by diazotizing the amines listed under the heading "Amine" and coupling the diazonium compounds formed with the compounds specified in the column entitled "Coupling component." The diazotization and coupling reactions may, for example, be carried out following the general procedure described in Examples 1 to 5, inclusive.

| Amine | Coupling component | Color on cellulose acetate silk |
| --- | --- | --- |
| o-(F, Cl, Br, I)-aniline | (1) 1-(ethyl-β-ketopropyl)-amino-3-chlorobenzene | Yellow. |
| Do | (2) 1-(β-hydoxyethyl-β-ketobutyl)-aminobenzene | Do. |
| Do | (3) β-ketopropylaniline | Do. |
| Do | (4) 1-(β-hydroxypropyl-β-ketopropyl)-aminobenzene | Do. |
| Do | (5) 1-(γ-hydroxypropyl-β-ketopropyl)-aminobenzene | Do. |
| Do | (6) 1-(benzyl-β-ketopropyl)-aminobenzene | Do. |
| 1-(F, Cl, Br, I)-aniline | (7) 1-(cyclohexyl-β-ketopropyl)-aminobenzene | Do. |
| Do | (8) 1-β-ketopropylamino-3-methylbenzene | Do. |
| Do | (9) 1-(glyceryl-β-ketopropyl)-amino-3-methylbenzene | Do. |
| Do | (10) 1-(ethyl-β-ketopropyl)-amino-3-methoxybenzene | Do. |
| Do | (11) 1-(ethyl-β-ketopropyl)-amino-2-methoxy-5-halogen benzene | Do. |
| Do | (12) 1-(butyl-β-ketopropyl)-amino-2-methoxy-5-methylbenzene | Do. |
| Do | (13) 1-(glyceryl-β-ketopropyl)-amino-2,5-diethoxybenzene | Do. |

| Amine | Coupling component | Color on cellulose acetate silk |
|---|---|---|
| 1-amino-2-chloro-4-methylbenzene | Components 1-13 above | Yellow. |
| 1-amino-2-bromo-4-methoxybenzene | do | Do. |
| 1-amino-2-chloro-5-ethylbenzene | do | Do. |
| 1-amino-2-chloro-5-ethoxybenzene | do | Do. |
| 1-amino-2,5-dihalogenbenzene | do | Orange-yellow. |
| 1-amino-3-nitro-6-methoxybenzene | do | Yellow to orange. |
| 1-amino-3-nitro-6-methylbenzene | do | Do. |
| p-Aminoacetophenone | do | Orange. |
| p-Aminobenzamide | do | Orange-yellow to orange. |
| p-Aminobenzene-sulfonamide | do | Do. |
| p-Nitroaniline | do | Orange to rubine. |
| 1-amino-2-methoxy-4-nitrobenzene | do | Do. |
| 1-amino-2-cyano-4-nitrobenzene | do | Orange to wine. |
| 1-amino-2,4-dinitrobenzene | do | Red to violet. |
| 1-amino-2,4-dinitro-6-(F, Cl, Br)-benzene | do | Red to purple-blue. |
| p-Aminoazobenzene | do | Orange to red. |
| o-(F, Cl, Br, I)-aniline | (14) 1-(methyl-γ-ketobutyl)-amino-3-bromobenzene | Yellow. |
| Do | (15) 1-(β-hydroxyethyl-γ-ketobutyl)-amino-3-chlorobenzene | Do. |
| Do | (16) γ-ketobutylaniline | Do. |
| Do | (17) Δ-ketoamylaniline | Do. |
| Do | (18) 1-(ethyl-γ-ketobutyl)-aminobenzene | Do. |
| Do | (19) Di-γ-ketobutylaniline | Do. |
| Do | (20) 1-(cyanomethyl-γ-keto)-butylaminobenzene | Do. |
| Do | (21) 1-(glycineamide-γ-keto)-butylaminobenzene | Do. |
| Do | (22) 1-(β-methoxyethyl-γ-ketobutyl)-amino-3-methylbenzene | Do. |
| Do | (23) 1-γ-ketoamylamino-2-methoxy-5-chlorobenzene | Do. |
| Do | (24) 1-(β-ketopropyl-γ-ketobutyl)-amino-2-methoxy-5-bromobenzene | Do. |
| Do | (25) 1-(β-sodiumsulfoethyl-γ-ketohexyl)-amino-2-methoxy-5-methylbenzene | Do. |
| Do | (26) 1-(β-sodiumsulfatoethyl-γ-ketobutyl)-amino-2,5-dimethoxybenzene | Do. |
| 1-amino-2-bromo-4-methyl-benzene | Components 14-26 above | Do. |
| 1-amino-2-chloro-4-ethoxybenzene | Do | Do. |
| 1-amino-2-bromo-5-propylbenzene | do | Do. |
| Methyl-anthranilate | do | Do. |
| 1-amino-2-chloro-5-bromobenzene | do | Orange to yellow. |
| 1-amino-2-methyl-5-nitrobenzene | do | Yellow to orange. |
| m-Nitroaniline | do | Do. |
| p-Aminoacetophenone | do | Orange. |
| 1-amino-2-methyl-4-nitrobenzene | do | Orange to rubine. |
| 1-amino-2-(F, Cl, Br,)-4-nitrobenzene | do | Orange to wine. |
| p-Aminoazobenzene | do | Orange to red. |
| 1-amino-2,4,6-trinitrobenzene | do | Red to blue. |
| Dianisidine | Do | Yellow to orange. |
| p-Nitroaniline | γ-ketobutylamino-2-methylbenzene | Orange. |
| 2-amino-5-nitro-phenylmethylsulfone | 1-(β-methoxyethyl-β-ketopropyl)-amino-3-chlorobenzene | Red. |

It will be understood that the compounds described herein are intended to be illustrative and not limitative of our invention. Any of the coupling components disclosed herein, for example, can be coupled with the diazo compounds of the amines disclosed herein to yield compounds included within the scope of our invention.

In order that the preparation of the azo compounds of our invention may be clearly understood, it is here noted that the coupling components may be prepared after the general methods described in the following literature references: Journal Chemical Society, page 2568 (1931); Liebig's Annalen, vol. 262, page 336; Comptes Rendus, vol. 150, page 1125; Bulletin Societe Chimique, 4), vol. 3, page 659; Journal American Chemical Society, vol. 31, page 1152 (followed by gentle hydrogenation); Liebig's Annalen, vol. 289, page 237; Journal für Praktische Chemie 2), vol. 75, page 342 and Friedlander, vol. 11, page 788.

The azo dye compounds of our invention are, for the most part, relatively insoluble in water. Those compounds which are insoluble in water may be advantageously employed for the direct dyeing of textile materials by grinding the dye to a fine powder, intimately mixing it with a suitable dispersing or solubilizing agent, and adding the resulting mixture to water or a dilute solution of soap in water to form an aqueous dyebath. Following this known preparation of the dyebath, the textile materials to be dyed may be added to the dyebath and the dyeing operation conducted in known fashion. The dye compounds of our invention which are water soluble do not, of course, require the use of a dispersing or solubilizing agent but may be applied to silk, wool and (depending upon the nature and position of the water-solubilizing group) organic derivatives of cellulose textile materials from an aqueous solution of the dye which may contain salt. For a more complete description as to how the azo dye compounds of our invention may be employed in dyeing or coloring operations, reference may be had to our U. S. Letters Patent No. 2,115,030, issued April 26, 1938. For a more detailed description as to how the water soluble azo dyes of our invention may be employed for the coloration of textile materials made of or containing organic derivatives of cellulose, silk and wool or mixtures of these, reference may be had to our U. S. Letters Patent No. 2,107,898, issued February 8, 1938.

We claim:

1. The azo compounds having the general formula:

$$R-N=N-R_1$$

wherein R and $R_1$ each represents the residue of an aryl nucleus of the benzene series and wherein the nucleus $R_1$ contains in para position to the azo bond an amino group substituted with a

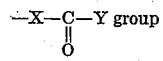

wherein X represents a saturated short chain hydrocarbon linkage and Y represents a low membered alkyl group.

2. The azo compounds having the general formula:

$$R-N=N-R_1$$

wherein R and $R_1$ each represents the residue of an aryl nucleus of the benzene series and wherein the nucleus $R_1$ contains in para position to the azo bond an amino group substituted with a saturated hydrocarbon linkage containing a straight chain of at least four carbon atoms and in which the carbon atom in the γ position, numbered from the nitrogen atom of said amino group, contains an oxygen atom joined directly thereto through a double bond.

3. The azo compounds having the general formula:

$$R-N=N-R_1$$

wherein R and $R_1$ each represents the residue of an aryl nucleus of the benzene series and wherein the nucleus $R_1$ contains in para position to the azo bond an amino group substituted with a $$-CH_2CH_2-\underset{\underset{O}{\|}}{C}-CH_3 \text{ group}$$

4. The azo compounds having the general formula:

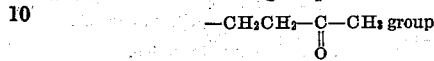

wherein R and $R_1$ each represents the residue of an aryl nucleus of the benzene series, $R_2$ represents a $$-X-\underset{\underset{O}{\|}}{C}-Y \text{ group}$$

wherein X represents a saturated short chain hydrocarbon linkage and Y represents a low membered alkyl group, $R_3$ represents a member selected from the group consisting of hydrogen, an alkyl group, a hydroxyalkyl group and a group represented by $R_2$ and wherein the

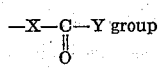 grouping is in para position to the azo bond.

5. The azo compounds having the general formula:

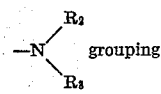

wherein R and $R_1$ each represents the residue of an aryl nucleus of the benzene series, $R_3$ represents a member selected from the group consisting of hydrogen, an alkyl group, a hydroxyalkyl group and a $$-CH_2CH_2-\underset{\underset{O}{\|}}{C}-CH_3 \text{ group}$$

and wherein the

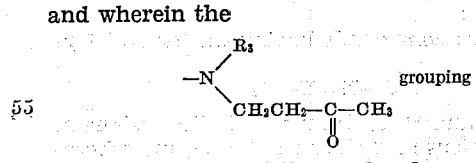 grouping is in para position to the azo bond.

6. Material made of or containing an organic derivative of cellulose colored with a nuclear non-sulfonated azo dye compound having the general formula:

$$R-N=N-R_1$$

wherein R and $R_1$ each represents the residue of an aryl nucleus of the benzene series and wherein the nucleus $R_1$ contains in para position to the azo bond an amino group substituted with a $$-X-\underset{\underset{O}{\|}}{C}-Y \text{ group}$$

wherein X represents a saturated short chain hydrocarbon linkage and Y represents a low membered alkyl group.

7. A cellulose acetate colored with a nuclear non-sulfonated azo dye compound having the general formula:

$$R-N=N-R_1$$

wherein R and $R_1$ each represents the residue of an aryl nucleus of the benzene series and wherein the nucleus $R_1$ contains in para position to the azo bond an amino group substituted with a $$-X-\underset{\underset{O}{\|}}{C}-Y \text{ group}$$

wherein X represents a saturated short chain hydrocarbon linkage and Y represents a low membered alkyl group.

8. A cellulose acetate colored with a nuclear non-sulfonated azo dye compound having the general formula:

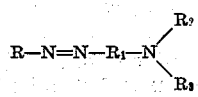

wherein R and $R_1$ each represents the residue of an aryl nucleus of the benzene series, $R_2$ represents a $$-X-\underset{\underset{O}{\|}}{C}-Y \text{ group}$$

wherein X represents a saturated short chain hydrocarbon linkage and Y represents a low membered alkyl group, $R_3$ represents a member selected from the group consisting of hydrogen, an alkyl group, a hydroxyalkyl group and a group represented by $R_2$ and wherein the

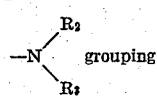 grouping is in para position to the azo bond.

JAMES G. McNALLY.
JOSEPH B. DICKEY.